United States Patent
Lee et al.

(10) Patent No.: US 7,369,774 B2
(45) Date of Patent: May 6, 2008

(54) OPTICAL FREQUENCY CONTROLLING DEVICE FOR ULTRA-DENSE WAVELENGTH-DIVISION-MULTIPLEXED OPTICAL CHANNELS

(75) Inventors: Jae-Seung Lee, Seoul (KR); Kyung-Hee Seo, Seoul (KR)

(73) Assignee: Kwangwoon Foundation (KR)

( * ) Notice: Subject to any disclaimer, the term of this patent is extended or adjusted under 35 U.S.C. 154(b) by 569 days.

(21) Appl. No.: 10/678,191

(22) Filed: Oct. 3, 2003

(65) Prior Publication Data

US 2004/0067067 A1   Apr. 8, 2004

(30) Foreign Application Priority Data

Oct. 4, 2002   (KR) .................. 10-2002-0060748

(51) Int. Cl.
*H04J 14/02*   (2006.01)
*H04B 10/02*   (2006.01)

(52) U.S. Cl. ........................ 398/96; 398/196

(58) Field of Classification Search .......... 398/95, 398/196; 372/32
See application file for complete search history.

(56) References Cited

U.S. PATENT DOCUMENTS

| | | | |
|---|---|---|---|
| 6,556,328 B1 * | 4/2003 | Tanaka | 398/192 |
| 6,853,456 B2 * | 2/2005 | Mells | 356/484 |
| 6,868,102 B2 * | 3/2005 | Brindel | 372/32 |
| 6,909,732 B2 * | 6/2005 | Imajuku et al. | 372/32 |
| 7,068,949 B2 * | 6/2006 | Jung et al. | 398/195 |
| 2003/0030876 A1 * | 2/2003 | Takei | 359/187 |

FOREIGN PATENT DOCUMENTS

WO   WO 01/73980 A1 * 10/2001

OTHER PUBLICATIONS

"Bidrectional DWDM Transmission Using a Beat-Frequency-Locking Method"; Authors: Yong-Sang Ahn, Sang-Yuep Kim, Sang-Hoon Han, Jae-Seung Lee, Sang-Soo Lee adn Wan-Seok Seo; IEEE Photonics Technology Letters, vol. 13, No. 8; Aug. 2001; pp. 899-901.

* cited by examiner

*Primary Examiner*—Shi K Li
(74) *Attorney, Agent, or Firm*—Cantor Colburn LLP

(57) ABSTRACT

Disclosed is an optical frequency controlling device for ultra-dense wavelength-division-multiplexed optical channels in which center frequencies of optical channels are aligned. An optical frequency controlling device for ultra-dense wavelength-division-multiplexed optical channels of the present invention comprises an optical channel unit for outputting a plurality of semiconductor laser beams which have different center frequencies, the semiconductor laser beams forming optical channels; an optical detection unit for performing optical detection on the plurality of semiconductor laser beams outputted from the optical channel unit and generating beat frequency signals; a microwave spectrum analyzing unit for outputting spectrum information of the beat frequency signals outputted from the optical detection unit in a digital signal; and a controller for receiving an output signal of the microwave spectrum analyzing unit and controlling the center frequencies of the optical channels of the optical channel unit.

2 Claims, 6 Drawing Sheets

OPTICAL FREQUENCY CONTROLLING DEVICE FOR ULTRA-DENSE WAVELENGTH-DIVISION-MULTIPLEXED OPTICAL CHANNELS

BACKGROUND OF THE INVENTION

1. Field of the Invention

The present invention relates to an optical frequency controlling device for ultra-dense wavelength-division-multiplexed optical channels, and more particularly, to an optical frequency controlling device for ultra-dense wavelength-division-multiplexed optical channels in which center frequencies of optical channels are aligned.

2. Description of the Related Art

To increase the transfer capacity of a strand of optical fiber, the gaps between the optical channels of the wavelength-division-multiplexed optical system have been being reduced from 100 GHz to 50 GHz, 25 GHz or the lower. There is no noticeable standard for classification of ultra-dense optical communications, but if the gaps between optical channels are usually 25 GHz or less and the number of the optical channels is 100 or more, such a communication belongs to the ultra-dense wavelength-division-multiplexed optical communication. In bi-directional optical communication systems, the difference between the center frequencies of optical channels through which beams travels in opposite directions can be very small as 10 GHz. This case is regarded to belong to the ultra-dense wavelength-division multiplexed optical communication.

In the conventional wavelength-division-multiplexed optical communication system, a wavelength locker or a Fabry-Perot filter controls center frequencies. However, since such a method to use optical elements has generally an error of a few GHz, in the wavelength-division-multiplexed optical communication system having a very narrow optical channel gap, it causes a serious problem. To align the ultra-dense wavelength-division-multiplexed optical channel, NTT of Japan employed a method in which one light source is modulated with a frequency corresponding to the optical channel frequency gap. However, in this method, its signal-to-noise ratio is low for each optical channel so that it is difficult to utilize it actually. Recently, Fiberspace company of United States has developed an innovative wavelength locker that lowers its error to about 100 MHz. However, every optical channel requires the wavelength locker for itself so that the cost problem still remains. As a result, the solution for this field has not been made completely.

Today, the device in which microwave beat frequency signal generated when optical detection is performed for optical channels of different wavelengths is used as a control signal and the gap between optical frequencies of the optical channel sections is maintained to be uniform is suggested in the related art. Using this device, relative optical channel gaps between the nodes communicate with each other in the bi-directional optical communication can be controlled much more precisely than a general wavelength locker. This technology is disclosed in the following paper: Yong-Sang Ahn, Sang-Yuep Kim, Sang-Hoon Han, Jae-Seung Lee, Sang-Soo Lee, and Wan-Seok Seo, "Bidirectional DWDM transmission using a beat-frequency-locking method," IEEE Photonics Technology Letters, vol. 13, pp. 899-901, 2001. However, since this technology is proper to keep the relative frequency between different optical channel sections to be stable, this technology is not proper to align light sources to be used in the general ultra-dense wavelength-division-multiplexed optical communication other than the bi-directional optical communication.

The technology in which two or three light sources are aligned using beat frequency signals has been studied. Usually, the difference between an actual frequency of a beat frequency signal and the desired frequency of the beat frequency signal is converted into electric signal and the optical channel gap or the channel spacing is stabilized using the converted electric signal. For example, in the U.S. Pat. No. 5,861,975, the technology in which the beat frequency signal is converted into the voltage signal proportional to the beat frequency and the converted voltage signal is used to align the optical channel. This is a suitable method to align a few light sources but it cannot be used when the numbers of optical channels and beat frequency signals are large.

SUMMARY OF THE INVENTION

Accordingly, the present invention is directed to an optical frequency controlling device for ultra-dense wavelength-division-multiplexed optical channels that substantially obviates one or more problems due to limitations and disadvantages of the related art.

An object of the present invention is to align center frequencies of optical channels used in an ultra-dense wavelength-division-multiplexed optical communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical frequency controlling device for ultra-dense wavelength-division-multiplexed optical channels includes an optical channel unit for outputting a plurality of semiconductor laser beams which have different center frequencies, the semiconductor laser beams forming optical channels; an optical detection unit for performing optical detection on the plurality of semiconductor laser beams outputted from the optical channel unit and generating beat frequency signals; a microwave spectrum analyzing unit for outputting spectrum information of the beat frequency signals outputted from the optical detection unit in a digital signal; and a controller for receiving an output signal of the microwave spectrum analyzing unit and controlling the center frequencies of the optical channels of the optical channel unit.

In another aspect of the present invention, an optical frequency controlling device for ultra-dense wavelength-division-multiplexed optical channels includes an optical channel unit for outputting a plurality of semiconductor laser beams which have different center frequencies, the semiconductor laser beams forming optical channels; an optical spectrum controller for changing optical spectra of the semiconductor laser beams outputted from the channel unit and outputting the changed optical spectra; an optical detection unit for performing optical detection on the plurality of semiconductor laser beams outputted from the optical channel unit and generating beat frequency signals; a microwave spectrum analyzing unit for outputting spectrum information of the beat frequency signals outputted from the optical detection unit in a digital signal; and a controller for receiving an output signal of the microwave spectrum analyzing unit and controlling the center frequencies of the optical channels of the optical channel unit and the optical spectrum controller.

In another aspect of the present invention, a bi-directional optical communication system utilizes the optical frequency controlling device for ultra-dense wavelength-division-multiplexed optical channels as described above.

In another aspect of the present invention, an optical frequency analyzer in which an optical frequency controlling device for ultra-dense wavelength-division-multiplexed optical channels as described above is utilized to calculate optical spectrum.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, the center frequencies of the ultra-dense wavelength-division-multiplexed optical channels are aligned using a microwave beat frequency signal as a control signal. To use the microwave beat frequency signal in aligning the ultra-dense wavelength-division-multiplexed optical channels in which the gap between the optical channels is very small and there are many optical channels, it should be easy to find the optical channels that contribute to form each beat frequency signal. Accordingly, a microwave spectrum analysis circuit is essentially needed but such a trial has not been executed.

In the present invention, microwave beat frequency signals are analyzed using a microwave spectrum analysis circuit. This microwave spectrum analysis circuit helps to analyze the complexly distributed microwave beat frequency signals generated when optical detection is performed on many optical channels. In the present invention, the spectrum of the light channels inputted to the optical detector is changed to find the positions of the optical channels in an optical frequency domain. For this purpose, we either place a tunable optical filter in front of the optical detector or apply the output of a wavelength tunable laser along with the optical channels to the optical detector. Accordingly, the optical frequency controlling device of the present invention can control optical channel gaps and optical channel center frequencies very precisely in the ultra-dense wavelength-division-multiplexed optical communication system. As a result, since every optical channel does not have to use a wavelength locker, the light source for the ultra-dense wavelength-division-multiplexed optical communication system can be made with low cost.

The present invention is an optical frequency controlling device for aligning the center frequencies of the optical channels used in the ultra-dense wavelength-division-multiplexing optical communication system to the desired position. Its basic structure is illustrated in FIG. 1 and the improved version of the basic structure is illustrated in FIG. 2.

The embodiments of the present invention will be described with accompanying drawings.

Figure 1:
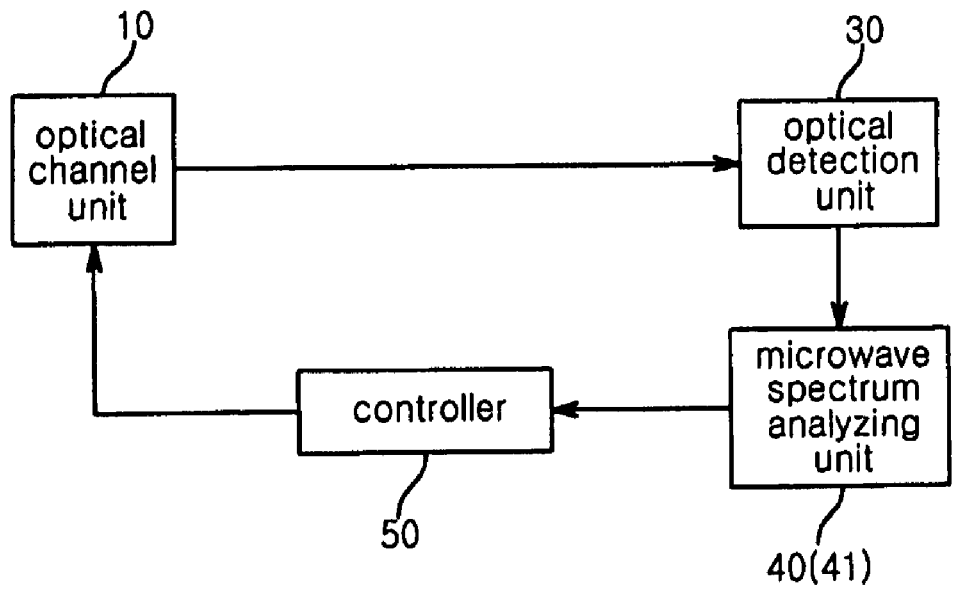
FIG. 1 illustrates an optical frequency controlling device for ultra-dense wavelength-division-multiplexed optical channels according to a first embodiment of the present invention.
Figure 2:
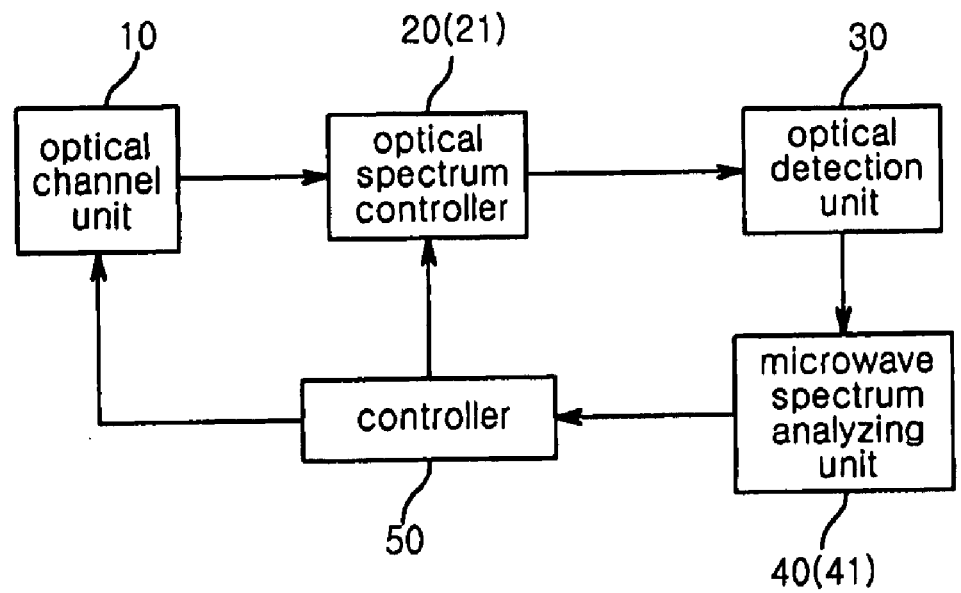
FIG. 2 illustrates an optical frequency controlling device for ultra-dense wavelength-division-multiplexed optical channels according to a second embodiment of the present invention.

FIG. 1 illustrates an optical frequency controlling device for ultra-dense wavelength-division-multiplexed optical channels according to a first embodiment of the present invention.

An optical channel unit 10 outputs ultra-dense wavelength-division-multiplexed optical channels. All the light sources which generate optical channels may be installed in the optical channel unit 10. However, in some case, some or all the optical channels can be received from some remote node to be used. The optical channels outputted from the optical channel unit 10 can be coupled with optical transmission path using optical couplers in various structures. Since the detail structures are not important in the present invention, they are omitted in FIG. 1. A plurality of optical channels outputted from the optical channel unit 10 are inputted to an optical detection unit 30 to generate a plurality of microwave beat frequency signals.

A microwave spectrum analyzing unit 40 that includes a microwave spectrum analysis circuit converts information on amplitudes and frequency distributions of microwave beat frequency signals into a digital signal and transfers the converted digital signal to a controller 50. The controller 50 analyzes an output signal of the microwave spectrum analyzing unit 40 and controls the center frequencies of the optical channels outputted from the optical channel unit 10. An additional optical amplifier (not shown in FIG. 1) can be used additionally where the light intensity is weak.

The frequency value of beat frequency signals indicates the gap between the center frequencies of two optical channels that contribute to generate the beat frequencies. Accordingly, if the two optical channels that generate the specific beat frequency signals are found, the gap between the center frequencies of the two optical channels can be found precisely. If the center frequency of one of the two optical channels has been already locked, the other optical channel can be aligned at the right center frequency position.

Some of the output optical channels of the optical channel unit 10 are the reference optical channels the wavelengths of which are locked by wavelength lockers or the like. The reference optical channels provide the reference frequency values necessary for aligning other optical channels. The output optical channels of the optical channel 10 may not include any reference optical channel. In this case, the optical channel unit 10 can use any one of its output optical channels as a reference channel and align the other optical channels. The output optical channels of the optical channel unit 10 have been generally modulated but can have not been modulated. The gaps between optical channels in optical frequency domain can be non-uniform.

As described above, even in the case that the optical channels in the remote node become the output optical channels of the optical channel unit 10, the controller 50 can send a signal to the corresponding remote node and control the center frequencies of the corresponding optical signals.

Thus, the optical frequency controlling device according to the first embodiment of the present invention can keep the difference between the optical channel center frequencies of different nodes to be uniform. In other words, the optical frequency controlling device according to the first embodiment of the present invention can stabilize the optical frequencies of light sources in remote nodes with respect to the channels located in a reference node and keep the relative gaps of optical frequencies of the optical channels of different nodes in the bi-directional optical communication system to be stable.

FIG. 2 illustrates an optical frequency controlling device for ultra-dense wavelength-division-multiplexed optical channels according to a second embodiment of the present invention. The second embodiment shown in FIG. 2 is made by adding an optical spectrum controller 20 to the optical frequency controlling device for ultra-dense wavelength-division-multiplexed optical channels of a first embodiment shown in FIG. 1. The description of the second embodiment is partly overlapped with that of the first embodiment, but for the convenience of the description flow, their repeated description will not avoided. The same reference will be used for the same component in drawings and related description.

An optical channel unit 10 outputs ultra-dense wavelength-division-multiplexed optical channels. All the sources that generate optical channels may be in the optical channel unit 10. Occasionally, however, some or all of the optical channels can be transmitted and received from some remote node and used. The optical channels outputted from the optical channel unit 10 can be coupled with optical transmission path using optical couplers in various structures. Since the detail structures are not important in the present invention, they are omitted in FIG. 1. The optical channel unit 10 outputs a plurality of semiconductor laser beams that have different center frequencies and are generated or received. The semiconductor beams outputted from the optical channel unit 10 is inputted to an optical spectrum controller 20.

The optical spectrum controller 20 changes the spectrum of semiconductor laser beams of the optical channel unit 10. The optical spectrum controller 20 removes some optical channels of the output optical channels of the optical channel unit 10 using an optical filter or adds some additional optical channels to the output optical channels of the optical channel unit 10 using the wavelength tunable laser to change the optical spectrum outputted from the optical channel unit 10. In other words, the distribution of the beat frequency signals generated during optical detection is changed to make the beat frequency signal generated by two specific optical channels be found easily. The optical channels outputted from the optical spectrum controller 20 are inputted into the optical detector 30 to generate a plurality of microwave beat frequency signals.

A microwave spectrum analyzing unit 40 that includes a microwave spectrum analysis circuit converts information on amplitudes and frequency distributions of microwave beat frequency signals into a digital signal and transfers the converted digital signal to a controller 50. The controller 50 analyzes an output signal of the microwave spectrum analyzing unit 40 and controls the center frequencies of the optical channels outputted from the optical channel unit 10. At the same time, the microwave spectrum analyzing unit 40 also controls the output spectrum of the optical spectrum controller 20. An additional optical amplifier (not shown in FIG. 1) can be used additionally where the light intensity is weak.

The frequency value of beat frequency signals indicates the gap between the center frequencies of two optical channels that contribute to generate the beat frequencies. Accordingly, if the two optical channels that generate the specific beat frequency signals are found, the gap between the center frequencies of the two optical channels can be found precisely. If the center frequency of one of the two optical channels has been already locked, the other optical channel can be aligned at the right center frequency position.

Some of the output optical channels of the optical channel unit 10 are reference optical channels the wavelengths of which are locked by wavelength lockers or the like. The reference optical channel provides reference frequency values needed to align the other optical channels. The output optical channel of the optical channel unit 10 does not have to include any reference optical channel. In this case, the optical channel 10 can use any one of its output optical channels as a reference channel and align the other optical channels. The output optical channels of the optical channel unit 10 have been generally modulated but can have not been modulated. The gaps between optical channels in optical frequency domain can be non-uniform.

As described above, even in the case that the optical channels placed on the remote node are the output optical channels of the optical channel unit 10, the controller 50 can send a signal to the corresponding remote node and control the corresponding center frequencies of the optical signals.

Thus, the optical frequency controlling device according to the second embodiment of the present invention can keep the difference between the optical channel center frequencies of different nodes to be uniform. In other words, the optical frequency controlling device according to the second embodiment of the present invention can stabilize the optical frequencies of light sources in remote nodes with respect to the channels located in a reference node and keep the relative gaps of optical frequencies of the optical channels placed on different nodes in the bi-directional optical communication system to be stable.

Figure 3:
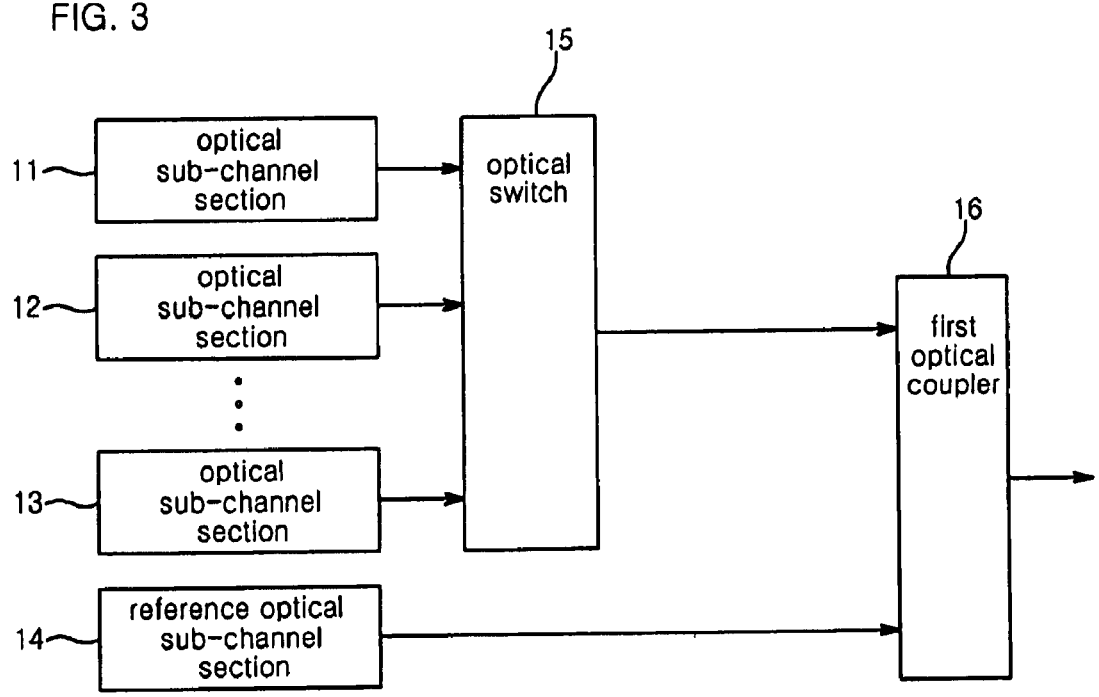
FIG. 3 illustrate an optical channel unit which has a plurality of optical sub-channel sections according to a third embodiment of the present invention.

FIG. 3 illustrates an optical channel unit that has a plurality of optical sub-channel sections according to a third embodiment of the present invention.

Referring to FIG. 3, the optical channel unit 10 can include a plurality of optical sub-channel sections 11, 12 and 13, a reference optical sub-channel section 14, an optical switch 15 and a first optical coupler 16. Each optical sub-channel section outputs at least one semiconductor laser beam that forms an optical channel. The reference optical sub-channel section 14 outputs only semiconductor laser beams that form reference optical channels. The laser beams outputted from the optical sub-channel sections 11, 12 and 13 are inputted to the optical switch 15 controlled by the controller 50. The optical switch 15 may have a plurality of output terminals. The laser beams outputted from the optical switch 15 are inputted to the first optical coupler 16. At this time, the laser beam outputted from the reference optical sub-channel section 14 is also inputted to the first optical coupler 16. The first optical coupler 16 couples the received laser beams and output the coupled laser beams in one path. The reference optical sub-channel section 14 and the optical sub-channel sections 11, 12 and 13 may include the optical channels transmitted from some remote nodes in its output. Occasionally, the reference optical sub-channel section 14 can be omitted.

Some of the laser beams outputted from the optical sub-channel sections 11, 12 and 13 may be coupled by an optical coupler into one path and transmitted to other nodes. However, such a structure including the optical coupler is omitted in the FIG. 3.

When the optical frequency controlling device is turned on or being used and the alignment of the optical channels is disheveled, the controller 50 may change the center frequencies or light intensities of the optical channels that belong to the optical channel unit 10 and the beat frequency signals the frequency position or the amplitude of which is changed are found. This is the easiest method to find the beat frequency signal made by specific optical channels.

In general, one optical channel contributes to generate several beat frequency signals. However, if the center frequency or the light intensity of the optical channel that is not aligned yet is changed, the specific beat frequency signal generated between this channel and one of the aligned optical channels can be found. In this case, the controller 50 aligns the center frequency of the optical channel that is not aligned yet so that the found beat frequency signal is located on a desired frequency location. To achieve this, we use usually the method in which the temperature of the corresponding laser diode is changed. Generally, the center frequencies of the align ed optical channels changes randomly in the range of ±100 MHz. The effect of this error can be reduced repeating the process described above.

Figure 4:
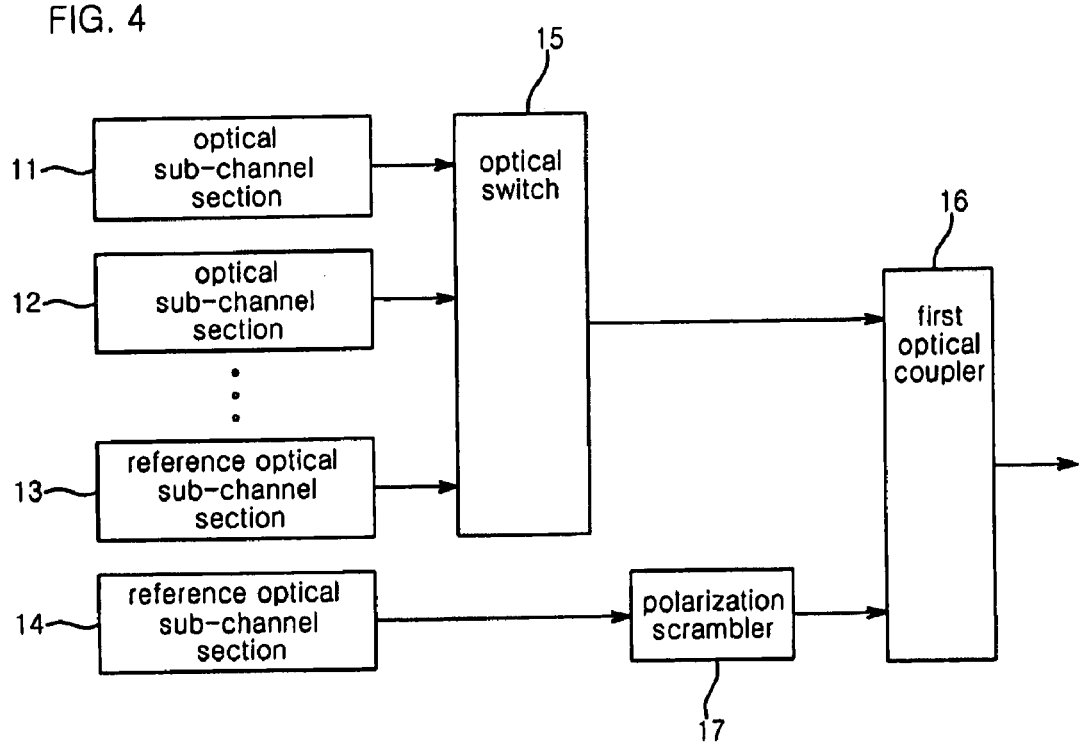
FIG. 4 illustrates an optical channel unit which has a plurality of optical sub-channel sections in which a polarization scrambler is utilized according to a fourth embodiment of the present invention.

FIG. 4 illustrates an optical channel unit, which has a plurality of optical sub-channel sections in which a polarization scrambler is utilized according to a fourth embodiment of the present invention.

The fourth embodiment of the present invention shown in FIG. 4 is made by adding a polarization scrambler to the optical channel unit of a third embodiment shown in FIG. 3. Some of the description of the fourth embodiment is overlapped with the description of the third embodiment, but for the convenience of the description flow, their repeated description will not avoided. The same reference will be used for the same component in drawings and related description.

Referring to FIG. 4, the optical channel unit 10 may include a plurality of optical sub-channel sections 11, 12 and 13, a reference optical sub-channel section 14, an optical switch 15 and a first optical coupler 16. Each optical sub-channel section outputs at least one semiconductor laser beam that forms an optical channel. The reference optical sub-channel section 14 outputs only semiconductor laser beams that form reference optical channels. The laser beams outputted from the optical sub-channel sections 11, 12 and 13 are inputted to the optical switch 15 controlled by the controller 50. The optical switch 15 may have a plurality of output terminals. The laser beams outputted from the optical switch 15 are inputted to the first optical coupler 16. At this time, the laser beam outputted from the reference optical sub-channel section 14 is also inputted to the first optical coupler 16. The first optical coupler 16 couples the received laser beams and output the coupled laser beams in one path. The reference optical sub-channel section 14 and the optical sub-channel sections 11, 12 and 13 may include the optical channels transmitted from a remote node. Occasionally, the reference optical sub-channel section 14 may be omitted. If a polarization scrambler 17 is placed on at least one input terminal, the beat frequency signal is much prevented from loosing stability. If the polarization scrambler 17 is not placed on at least one input terminal, the optical channels cannot be polarized or can become unstable with respect to time.

Some of the laser beams outputted from the optical sub-channel sections 11, 12 and 13 may be coupled by an optical coupler into one path and transmitted to other nodes. However, such a structure including the optical coupler is omitted in the FIG. 4.

When the optical frequency controlling device is turned on or being used and the alignment of the optical channels is disheveled, the controller 50 may change the center frequencies or light intensities of the optical channels that belong to the optical channel unit 10 and the beat frequency signals the frequency position or the amplitude of which are changed are found. This is the easiest method to find the beat frequency signal made by specific optical channels.

In general, one optical channel contributes to generate several beat frequency signals. However, if the center frequency or the light intensity of the optical channel that is not aligned yet is changed, the specific beat frequency signal generated between this channel and one of the aligned optical channels can be found. In this case, the controller 50 aligns the center frequency of the optical channel that is not aligned yet so that the found beat frequency signal is located on a desired frequency location. To achieve this, we use usually the method in which the temperature of the corresponding laser diode is changed. Generally, the center frequencies of the align ed optical channels changes randomly in the range of ±100 MHz. The effect of this error can be reduced repeating the process described above.

Figure 5:
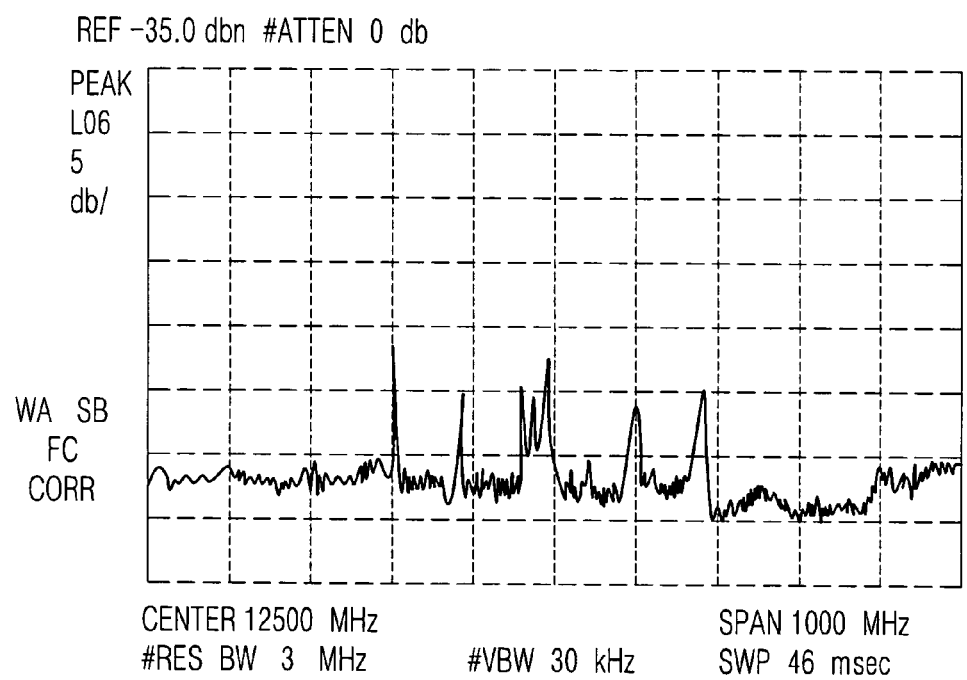
FIG. 5 is a diagram showing a spectrum of beat frequency signal that are not aligned.
Figure 6:
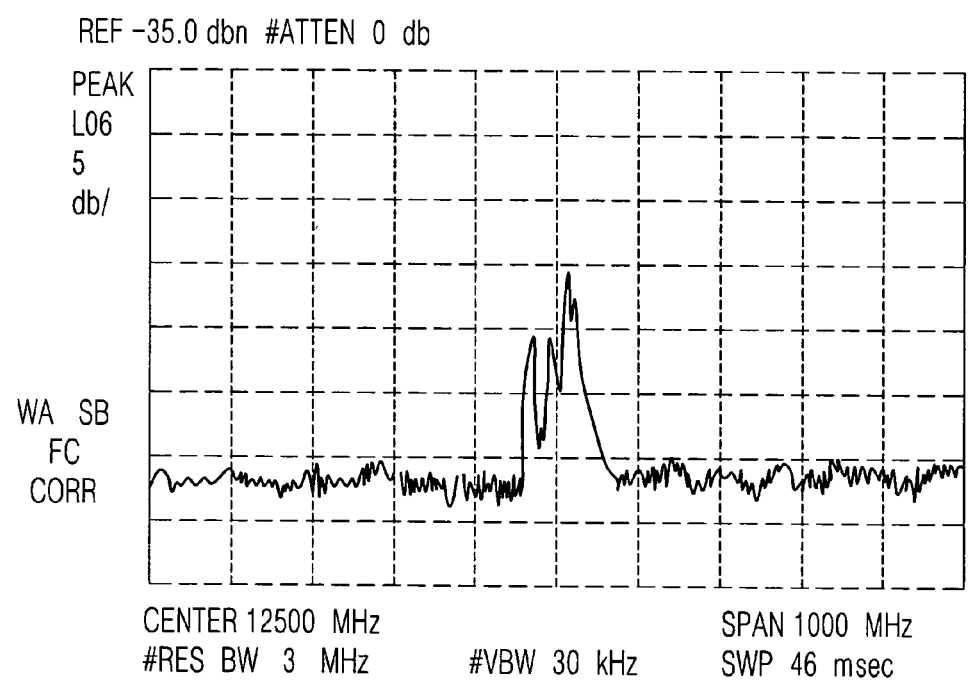
FIG. 6 is a diagram showing a spectrum of aligned beat frequency signals.
Figure 7:
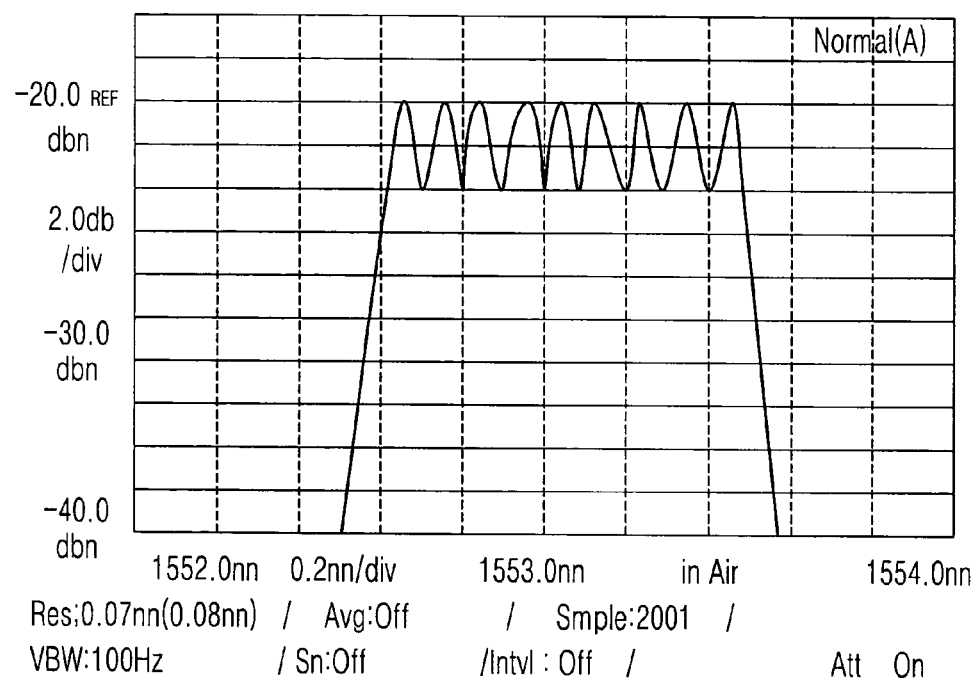
FIG. 7 is a diagram showing the spectrum of aligned optical channels.

FIG. 5 is a diagram showing a spectrum of beat frequency signals that are not aligned. FIG. 6 is a diagram showing a spectrum of aligned beat frequency signals. FIG. 7 is a diagram showing the spectrum of aligned optical channels.

In the present invention, since the optical channel gaps are controlled very accurately, even some of the reference optical channel errors can be corrected. To perform such operations, the microwave spectrum analyzing unit 40 is required very essentially to inform the distribution of beat frequency signals. To prove the usefulness of this invention, we executed the experiment in which one optical sub-channel section that have seven optical channels is aligned with respect to one reference optical channel section that has two reference optical channels with a gap of 100 GHz. To find the beat frequency signal generated by a specific optical channel, the temperature of the corresponding laser diode was controlled to change the center frequencies of all the optical channels successively. All the optical channels were modulated in 10 Gbps and the gap or the channel spacing between the optical channels are 12.5 GHz. FIGS. 5 and 6 are the electrical spectra before and after aligning the beat frequency signals generated by the optical detection of two optical channel sections respectively. The spectra are obtained from a microwave spectrum analyzer. The gaps between all the optical channels are within ±50 MHz. FIG. 7 is an optical spectrum measured by an optical spectrum analyzer after aligning the optical channels.

The method described above can deteriorate the quality of the signals in communication by changing the center frequency or the light intensity of the optical channel. To overcome such a problem and identify the beat frequency signals more easily, the optical spectrum controller 20 is utilized as shown in FIG. 2. If the optical spectrum controller 20 includes a tunable optical filter 21, the tunable optical filter 21 reduces the number of optical channels inputted to the optical detection unit 30 and makes the power of the output optical channels of the optical spectrum controller 20 different from each other. Accordingly, it becomes easy to identify the beat frequency signals. The controller 50 controls the center transmission frequency of the tunable optical filter 21.

Figure 8:
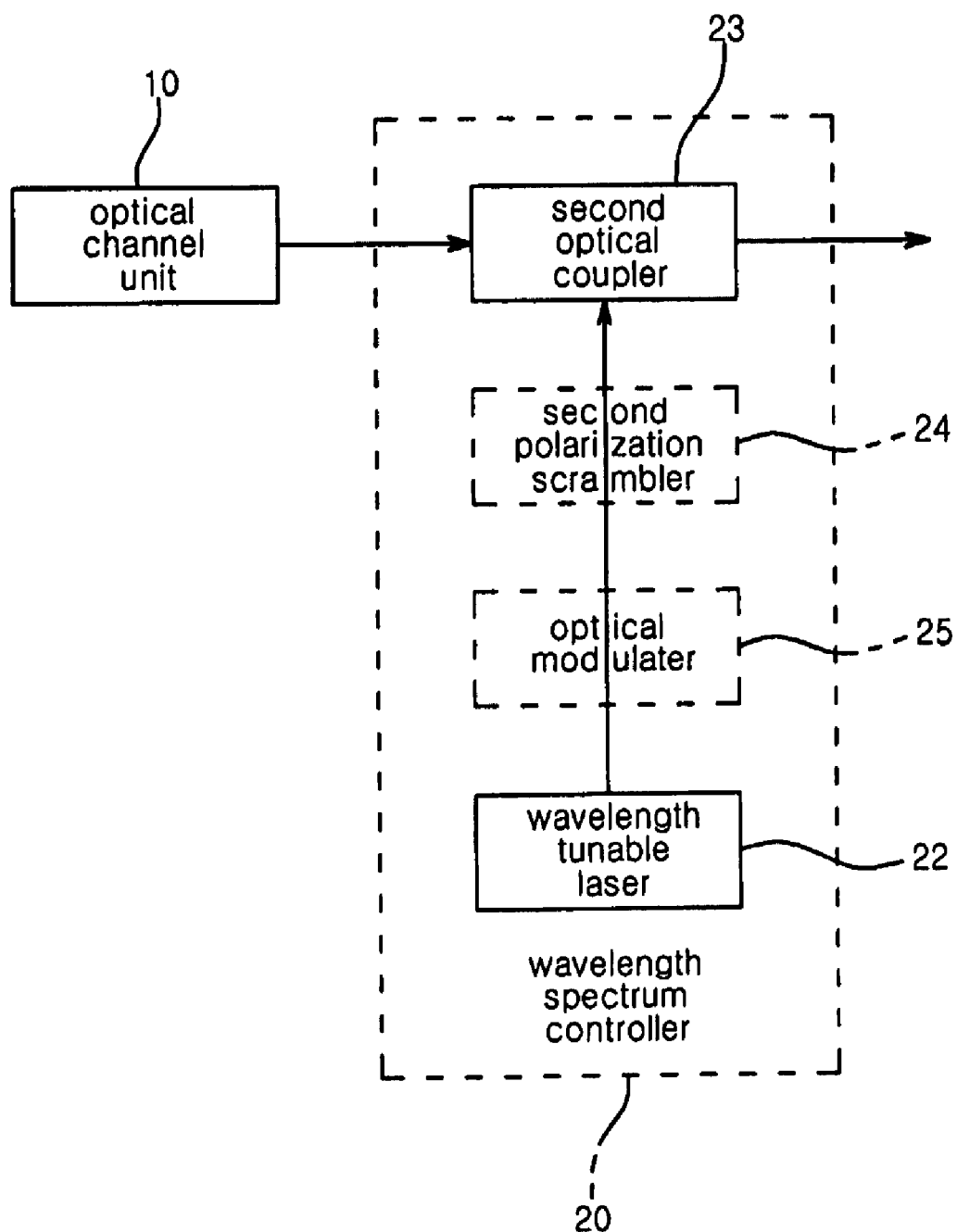
FIG. 8 illustrates a light spectrum controller including wavelength tunable laser according to a fifth embodiment of the present invention.

FIG. 8 illustrates a light spectrum controller including a wavelength tunable laser according to a fifth embodiment of the present invention.

Referring to FIG. 8, the optical spectrum controller 20 may include a wavelength tunable laser 22 for varying the wavelength of the output light and a second optical coupler 23 for coupling an output signal of the wavelength tunable laser 22 with the output signal of the optical channel unit 10 in one optical path. The center frequency of the wavelength tunable laser 22 is controlled by the controller 50. The output power of the wavelength tunable laser 22 can be made high to identify very easily the beat frequency signals made by the wavelength tunable laser 22 and neighboring optical channels.

Alternatively, the optical spectrum controller 20 may include second polarization scrambler 24 at one of input terminals thereof for reducing polarization effects.

Alternatively, the optical spectrum controller 20 may include an optical modulator 25 for performing periodic optical modulations on the output signal of the wavelength tunable laser 22.

The two beat frequency signals made by two optical channels, whose optical frequencies are nearest to that of the output light generated by the wavelength tunable laser 22 in shorter and longer wavelength directions, with the output light generated by the wavelength tunable laser 22 have lower frequencies than other beat frequency signals and can be distinguished very easily from other beat frequency signals. The sum of the center frequencies of these two beat frequency signals is the same as the difference of the center frequencies of the two optical channels whose optical frequencies are nearest to that of the output light generated by the wavelength tunable laser 22 in shorter and longer wavelength directions.

For further detailed description, suppose that the center frequency of the output light of the wavelength tunable laser 22 is ft and the center frequencies of the two optical channels that have the center frequencies nearest to ft in shorter and longer wavelength directions among the optical channels outputted from the optical spectrum controller 20 are fa and fb where fa≦ft≦fb. The beat frequency components that have frequencies of (ft−fa) and (fb−ft) are generated at the output terminals of the optical detection unit 30 and their sum fd=fb−fa is the optical channel gap or the channel spacing of the two channels located at fa and fb. If fa is fixed at the desired position and fd is larger than the desired optical channel gap, fb is decreased. Otherwise, fb is increased. As a result, fd can be set to the desired value. At this time, it is convenient to set ft such that (ft−fa) and (fb−ft) are comparable.

If the wavelength of the output light of the wavelength tunable laser 22 is changed to repeat the process described above, all the optical channels can be aligned. The controller 50 controls the center frequency of the wavelength tunable laser 22. At this time, to reduce the polarization dependency, the output light of the wavelength tunable laser 22 can be inputted to the second optical coupler 23 through the second polarization scrambler 24. The output light of the wavelength tunable laser 22 can have a plurality of wavelengths if necessary. The output light of the wavelength tunable laser 22 may be modulated into a periodic waveform. This decreases the magnitudes of beat frequencies between the wavelength tunable laser 22 and its adjacent channels, so that the microwave spectrum analyzing unit 40 can be constructed with cheap low frequency circuits.

In the above example, if the output light of the wavelength tunable laser 22 is modulated with the frequency of fd/2, the lowest two frequency components of the beat frequency signals generated at the output terminals of the optical detection unit 30 are $$\left| fb - ft - \frac{fd}{2} \right| \text{ and } \left| ft - \frac{fd}{2} - fa \right|.$$

Since the two frequencies are the same if fd=fb−fa, the optical channels can be aligned quickly. The wavelength tunable laser 22 may be replaced by the light obtained by branching, amplifying, and demultiplexing the output light of the optical channel unit 10.

The alignment order of the optical channels is usually a nearer frequency order from the reference optical channel to the next reference optical channel. To enhance the precision, the above-mentioned procedure can be repeated or the alignment order of the optical channels can be reversed to realign the optical channels.

In the present invention, the errors of the center frequencies of optical channels increases as the optical channels are farther from the reference channels. Accordingly, the center frequency gaps of the reference optical channels should not be too far and the values of the gaps are determined by the precision of the used devices. For the equal channel spacing case, to see the alignment errors of the optical channels, it is useful to ascertain whether the frequency distribution of the beat frequency signals is symmetric with respect to the desired frequency value.

In general, the optical channels outputted from the optical channel unit 10 are modulated and the beat frequency signals can be clearly observed by the microwave spectrum analyzing unit 40 if carrier components exist after the optical modulation. However, if the carrier components do not exist, each beat frequency signal is distributed over a wide frequency range. In this case, the channel spacing can be calculated from the distribution shape.

The optical detection unit 30 may include a photodiode and a resistor.

The microwave spectrum analyzing unit 40 may simply include a microwave spectrum analyzer 41 or may be implemented using an electronic circuit that has the same function of the microwave spectrum analyzer 41.

As described above, in the case that the output light of the wavelength tunable laser 22 is modulated periodically, the microwave spectrum analyzing unit 40 can be implemented more cheaply without a microwave spectrum analyzer. Also, additional microwave amplifiers are used where amplitudes of electric signals are weak.

Since the device of the present invention informs clearly of the optical frequency distances between the optical channels, the device of the present invention can be used as an optical spectrum analyzer for optical channels used in the ultra-dense wavelength-division-multiplexed optical communication systems.

In the present invention, optical channels used in ultra-dense wavelength-division-multiplexed optical communication systems in which frequency gaps between the optical channels is 25 GHz or less can be aligned with the error of a few hundreds MHz or less in optical frequency domain. The device of the present invention is cheaper than the conventional device that employs an expensive wavelength locker for every optical channel. The device of the present invention can keep the center frequency gaps of the optical channels of different nodes be uniform. In other words, the present invention can be used in order that one reference node aligns optical frequencies of light sources in the other nodes to be constant. The present invention can be used in bi-directional optical communication networks in order that optical channel spacing values between different node channels become stable. Of course, the present invention can be applied for the optical channel gaps higher than 25 GHz if the used elements can operate at high beat frequencies.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical frequency controlling device for ultra-dense wavelength-division-multiplexed optical channels, the device comprising:

an optical channel unit for outputting at least two semiconductor laser beams that form optical channels with different center frequencies;

an optical detection unit for performing optical detection on the semiconductor laser beams outputted from the optical channel unit and generating beat frequency signals;

a microwave spectrum analyzing unit for outputting the spectral information of the beat frequency signals outputted from the optical detection unit as a digital signal;

a controller for receiving the output signal from the microwave spectrum analyzing unit and controlling the center frequencies of the optical channels of the optical channel unit; and an optical spectrum controller for receiving outputs of the optical channel unit and the controller to change optical spectra of the semiconductor laser beams outputted from the optical channel unit, wherein the microwave spectrum analyzing unit includes a microwave spectrum analyzing circuit for providing the spectral information of the beat frequency signals to the controller so that the controller control the center frequencies of the optical channels of the optical channel unit, wherein the optical spectrum controller comprises:

a wavelength tunable laser for supplying a wavelength tunable laser light; and an optical coupler for coupling an output signal of the wavelength tunable laser with an output signal of the optical channel unit in one optical path.

2. The device as claimed in claim 1, wherein the output signal of the wavelength tunable laser is subject to periodic optical modulations and provided to the optical coupler.

* * * * *